United States Patent
Becker

(10) Patent No.: US 9,046,159 B2
(45) Date of Patent: Jun. 2, 2015

(54) ACTUATING DRIVE FOR A RAIL GUIDE OF A LONGITUDINAL ADJUSTMENT OF A MOTOR VEHICLE SEAT

(75) Inventor: Burckhard Becker, Solingen (DE)

(73) Assignee: Johnson Controls Metals and Mechanisms GmbH & Co., Solingen (DE)

( * ) Notice: Subject to any disclaimer, the term of this patent is extended or adjusted under 35 U.S.C. 154(b) by 0 days.

(21) Appl. No.: 14/236,416

(22) PCT Filed: Aug. 1, 2012

(86) PCT No.: PCT/EP2012/065062
§ 371 (c)(1),
(2), (4) Date: Jan. 31, 2014

(87) PCT Pub. No.: WO2013/017632
PCT Pub. Date: Feb. 7, 2013

(65) Prior Publication Data
US 2014/0197658 A1    Jul. 17, 2014

(30) Foreign Application Priority Data

Aug. 1, 2011    (DE) .................. 10 2011 080 219

(51) Int. Cl.
| | |
|---|---|
| B60N 2/06 | (2006.01) |
| F16H 25/20 | (2006.01) |
| B21D 19/08 | (2006.01) |
| B21D 53/88 | (2006.01) |
| B60N 2/02 | (2006.01) |
| B60N 2/07 | (2006.01) |
| B60N 2/16 | (2006.01) |

(Continued)

(52) U.S. Cl.
CPC ........... *F16H 25/20* (2013.01); *Y10T 74/18576* (2015.01); *B21D 19/08* (2013.01); *B21D 53/88* (2013.01); *B60N 2/0232* (2013.01); *B60N 2/067* (2013.01); *B60N 2/0715* (2013.01); *B60N 2/0745* (2013.01); *B60N 2/0747* (2013.01); *B60N 2/1695* (2013.01); *B60N 2/1832* (2013.01); *B60N 2/1853* (2013.01); *B21D 22/02* (2013.01); *B60N 2/07* (2013.01)

(58) Field of Classification Search
CPC .... B60N 2/0232; B60N 2/067; B60N 2/0715; B60N 2/0745
USPC ................ 296/65.13, 65.15, 65.14; 74/89.23; 248/429
See application file for complete search history.

(56) References Cited

U.S. PATENT DOCUMENTS

| | | | |
|---|---|---|---|
| 4,569,563 A | 2/1986 | Fourrey | |
| 5,012,613 A | 5/1991 | Sekine | |

(Continued)

FOREIGN PATENT DOCUMENTS

| | | | |
|---|---|---|---|
| DE | 42 38 486 A1 | 10/1993 | |
| DE | 10 2006 047 525 A1 | 5/2007 | |

(Continued)

*Primary Examiner* — Jason S Morrow
(74) *Attorney, Agent, or Firm* — McGlew and Tuttle, P.C.

(57) ABSTRACT

An actuating drive for a rail guide of a longitudinal adjustment of a motor vehicle seat has a rotational drive, which has an output shaft (70), and a transmission, which has a spindle nut (54), which is rotationally connected to the output shaft (70) and which has a spindle (52). The spindle (52) has a spindle thread, with which the spindle nut (54) is engaged. The spindle (52) is curved in a circular radius of curvature (42). The radius of curvature (42) is between 1,500 and 3,000 mm. The spindle nut (54) is a straight nut.

15 Claims, 3 Drawing Sheets

(51) Int. Cl.
*B60N 2/18* (2006.01)
*B21D 22/02* (2006.01)

(56) References Cited

U.S. PATENT DOCUMENTS

| | | | | |
|---|---|---|---|---|
| 5,103,126 A | * | 4/1992 | Mehnert | 310/80 |
| 5,860,319 A | | 1/1999 | Via | |
| 5,924,668 A | | 7/1999 | Garrido | |
| 5,941,495 A | | 8/1999 | Bauer et al. | |
| 6,260,922 B1 | | 7/2001 | Frohnhaus et al. | |
| 8,038,197 B2 | * | 10/2011 | Koga | 296/65.18 |
| 8,328,155 B2 | * | 12/2012 | Kostin | 248/429 |
| 2005/0269478 A1 | * | 12/2005 | Woehrle et al. | 248/430 |
| 2010/0320352 A1 | * | 12/2010 | Weber | 248/429 |
| 2011/0079699 A1 | * | 4/2011 | Tarusawa et al. | 248/430 |
| 2012/0205511 A1 | * | 8/2012 | Hofmann | 248/429 |
| 2014/0175249 A1 | * | 6/2014 | Becker et al. | 248/429 |

FOREIGN PATENT DOCUMENTS

| | | |
|---|---|---|
| DE | 10 2006 048 786 A1 | 5/2007 |
| EP | 0 123 601 A1 | 10/1984 |
| EP | 1 645 458 A1 | 4/2006 |
| GB | 2 071 486 A | 9/1981 |
| JP | H01 87042 U | 6/1989 |
| WO | 99/51456 A1 | 10/1999 |
| WO | 03/068551 A1 | 8/2003 |

* cited by examiner

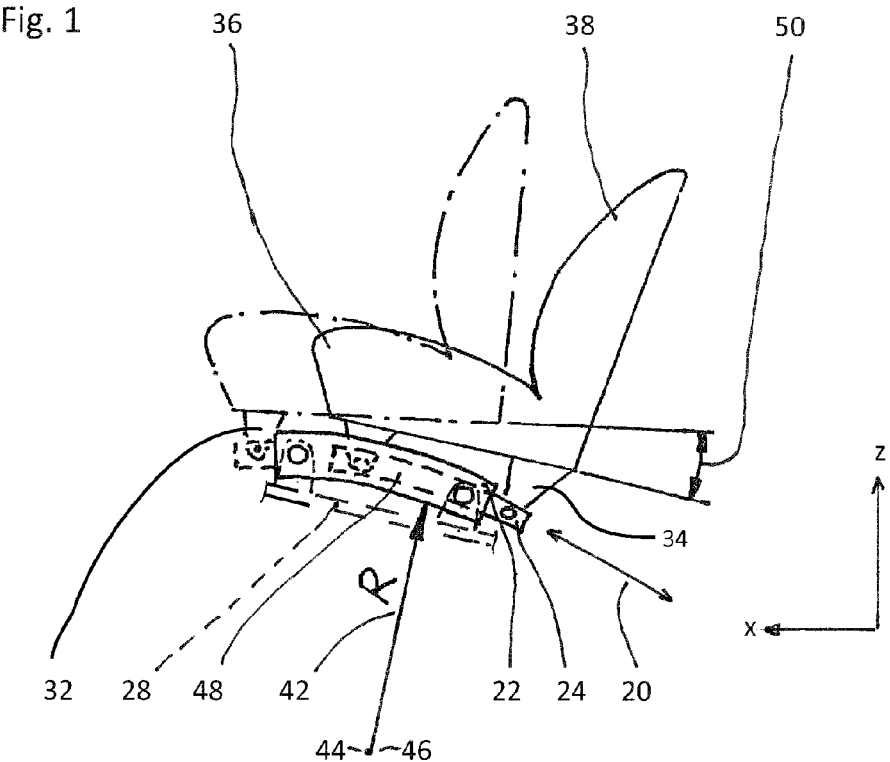
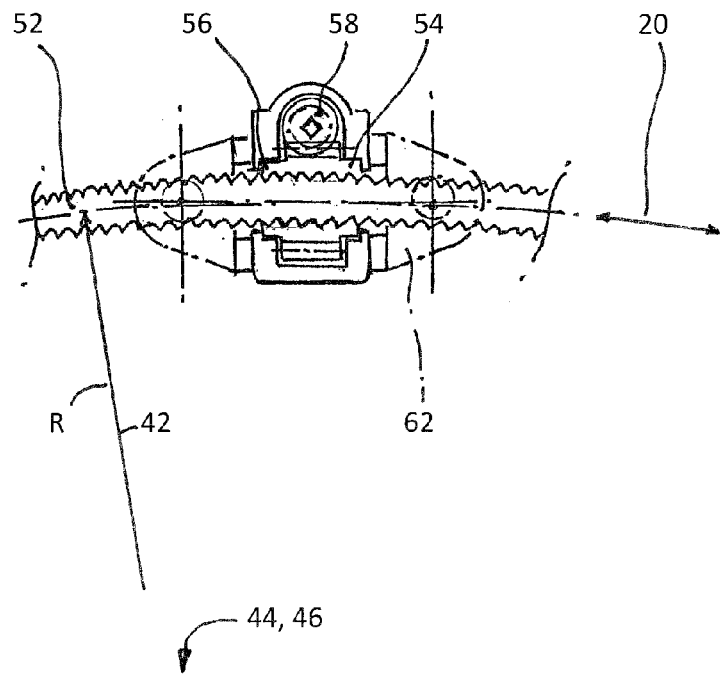

ACTUATING DRIVE FOR A RAIL GUIDE OF A LONGITUDINAL ADJUSTMENT OF A MOTOR VEHICLE SEAT

CROSS REFERENCE TO RELATED APPLICATIONS

This application is a United States National Phase Application of International Application PCT/EP2012/065062 filed Aug. 1, 2012 and claims the benefit of priority under 35 U.S.C. §119 of German Patent Application 10 2011 080 219.3 filed Aug. 1, 2011, the entire contents of which are incorporated herein by reference.

FIELD OF THE INVENTION

The invention relates to an actuating drive for a rail guide of a longitudinal adjustment mechanism of a motor vehicle seat, comprising a rotary drive unit, particularly an electric motor, having an output shaft and a gear unit comprising a spindle nut rotationally connected to the output shaft and a spindle, the spindle comprising a spindle thread with which the spindle nut is in engagement. Furthermore, it relates to a rail guide having such an actuating drive, a vehicle seat equipped therewith and a vehicle equipped therewith.

BACKGROUND OF THE INVENTION

Such an actuating drive for a rail guide is known from WO 03/068551 A1, U.S. Pat. Nos. 5,924,668 A, 5,860,319 A and 6,260,922 B1. Associated rail guides are known from DE 10 2006 048 786 A1, U.S. Pat. No. 5,941,495 A and DE 42 38 486 A1 (here, for example, FIG. 2), and from DE 10 2006 047 525 A1.

The spindles in the actuating drives according to the prior art extend in a straight line. This has great advantages; the spindles can be manufactured and, if necessary, aligned with precision, attachments are simple and a consistently good adjustability over the entire length of the adjustment distance can be obtained.

In the case of straight spindles, there is, however, the disadvantage that the seat is only moved in a linear manner in space when adjusted, but that no other movements are possible. A tall passenger will set the seat low in a downward direction and far backwards. In contrast, a small passenger will set the seat far towards the front and high. In the case of an adjustment mechanism according to the prior art, the inclination of the backrest is maintained. It can be set separately by means of a separate backrest joint. As a rule, a tall passenger will set the backrest into a position in which it is inclined more relative to the vertical than is the case for a small passenger. If a separate backrest joint is provided, this means a certain expenditure. The inclination of the seat surface is also chosen differently by tall and small persons. In order to be able to adjust the inclination of the seat surface, there are seat inclination adjustment mechanisms. They offer good comfort but also require added expenditure. In addition, the seats according to the prior art frequently have a seat height adjustment mechanism. This also means additional weight and additional expenditure. This applies to every additional adjustment device.

SUMMARY OF THE INVENTION

The invention is based on the above background. It has the object to further develop the above-mentioned actuating drive for a rail guide and to provide an actuating drive itself achieves as good a setting as possible for the wide range of passengers so that additional setting devices can be omitted as far as possible. In this case, the actuating drive is supposed to still have a simple structure; it is supposed to satisfy the requirements made to an actuating drive according to the prior art. It is supposed to be suitable for manual and motor-operated adjustment devices.

Based on the actuating drive of the type mentioned in the introduction, this object is achieved by the spindle being curved in a circular radius of curvature, the radius of curvature being between 1,500 and 3,000 mm, in particular between 1,800 and 2,500 mm, and the spindle nut is a straight nut.

In contrast to the prior art, this actuating drive enables an adjustment, no longer along a straight line, but on an arc of a circle. The particular choice of radii of curvature within the specified limits results in a seat that is located far back in the rail guide being able to be positioned slightly more obliquely towards the rear than a seat that is set in the front region of the rail guide. This makes it possible to dispense with additional setting devices, such as a seat height adjustment mechanism and/or backrest inclination adjustment mechanism. This means that a considerable amount of expenditure and weight can be saved. In this way, a motor vehicle seat can be formed to be significantly lighter than in accordance with the prior art.

The curvature following an arc of a circle has a center of curvature which, in the installed state of the motor vehicle seat, is located underneath the seat. The center of curvature is located on the side of the spindle that faces away from the seat region and the backrest.

Spindles with such a radius of curvature can be manufactured with precision. Starting with a straight spindle, curving is done in a mold or by means of another suitable device.

Despite the displacement no longer being linear, good synchronism, precise guidance and a high degree of manufacturing precision are achieved.

The spindle nut is a straight nut; it is unchanged as compared to the prior art. A straight nut is understood to be a nut in which the internal thread is situated on an outer cylinder surface. A straight nut can be used because the curvature of the spindle, even at the specified smallest radius of curvature of 1,500 mm, causes such a small deviation from a straight line, seen over the length of the spindle nut, that a normal spindle nut can be used. The deviations from a straight line become smaller the larger the radius of curvature becomes. If a spindle with an axial length of at most 15 mm, in particular 12 mm at most, preferably only 10 mm axial length is used, the deviations, even at the smallest radius of curvature of the spindle, remain so that no noticeable influence on the cooperation of the spindle nut and the spindle is perceptible. The spindle is stationary. It is connected to a rail, particularly the floor rail. Solutions in which the curved spindle is rotated are also conceivable.

If mention is made of a radius of curvature for the spindle, then this is to be understood in relation to the radius of curvature of the center line of the spindle. Preferably, the curvatures of the outer line of the spindle and of the inner line of the spindle have the same center of curvature. In particular, this also applies to the rails that are used in connection with the spindle. Where the spindle is located, the radius of curvature of the rails is to match the radius of curvature of the spindle. Regions of the spindle that are situated farther towards the outside have a larger radius of curvature; the centers of these regions lie on a center point line which is a parallel to the y-axis.

It is also an object of the invention to provide a method for producing a rail guide with such an actuating drive.

In the method for producing such a rail guide, the floor rail and the seat rail are each manufactured from a suitable blank; this blank extends along the radii of curvature that the spindle or the finished rail have. The blanks are stamped in respective stamping dies; stamping takes place in at least one stamping step. In this way, a rail fitting the actuating drive is prepared.

This method is advantageous in that the desired accuracies are achieved. Rails can be produced in this manner that are easily adjustable despite the curved profile of the displacement path, that are guided within each other precisely, and that have good sliding properties.

Usually, a longitudinal adjustment mechanism has two rail guides which are generally largely constructionally identical. In the case of a motor vehicle seat with two rail guides, both rail guides are bent with the same radius of curvature. The floor rail preferably has fastening regions; with these, it can be connected to a floor assembly of the motor vehicle.

The invention also relates to a motor vehicle seat with a rail guide as described above. Here, the seat frame comprises connecting parts; the connecting parts are connected to the means for fastening the seat rail, preferably the two seat rails of each side.

In the motor vehicle seat, the seat region is preferably rigidly connected to the rails. No setting devices are provided between the seat rail and the seat region. This saves the components of a seat height adjustment mechanism and/or seat inclination adjustment mechanism which are usually provided. These components include, for example, a seat-lifting spring that has to have a certain spring force, which means a certain weight. Moreover, joint arms and setting devices, for example wobble joint fittings, are saved.

The rotary drive unit has an output shaft. Preferably, the rotary drive unit is an electric motor. The rotary drive unit can also be designed for manual adjustment. In that case, the rotary drive unit is to be actuated by hand. It comprises, for example, a crank which is within the reach of a passenger and via which the passenger introduces the rotary movement into the gear unit. In contrast to a rail guide according to the prior art equipped with a locking device to be operated manually, no spring is required that biases the seat forward within its rail guide. This spring must have a considerable spring force; it contributes to the overall weight. Such a spring is saved.

Preferably, such a motor vehicle seat has no additional setting device, in particular no seat height adjustment mechanism and/or no backrest inclination adjustment mechanism.

Finally, the invention also relates to a motor vehicle equipped with a rail guide or a motor vehicle seat as described above. In this motor vehicle, the rail guide is disposed in such a way that, in the rearmost position of the longitudinal adjustment mechanism, the motor vehicle seat, particularly its backrest, is inclined rearwards at an angle of 10° to 15° measured from the vertical, and in the foremost position is inclined rearwards at an angle of 5° to 10°, again measured from the vertical, with the change of angle between these two positions being at least 4°, preferably 6°. In this way, the desired adjustment positions are obtained directly by means of the rail guide without any additional setting devices being required. This results in a significant advantage with regard to cost and weight.

Preferably, all centers of curvature lie on the center point line, which is a parallel to the y-axis. The radii extend perpendicular to this center point line. In the case of a longitudinal guide with two rail guides, the centers of curvature of both rail guides lie on the same center line, but at different points thereon. In each individual rail of a rail guide, the centers of the radii of curvature of the edges lie on the center point line. There, they have the same spacing from each other as they are spaced in the rail itself in the y-direction. The radii of curvature of different partial regions of the rails are different. They extend concentrically with respect to each other.

Other advantages and features of the invention become apparent from the other claims as well as from the following description of an exemplary embodiment of the invention, which shall be understood not to be limiting and which will be explained below with reference to the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic side view of a motor vehicle seat with a curved rail guide;

FIG. 3 is an axial cross sectional view through a spindle of a spindle drive with a spindle nut, housing and accessories, only the region around the spindle nut is shown;

DESCRIPTION OF THE PREFERRED EMBODIMENTS

Figure 2:
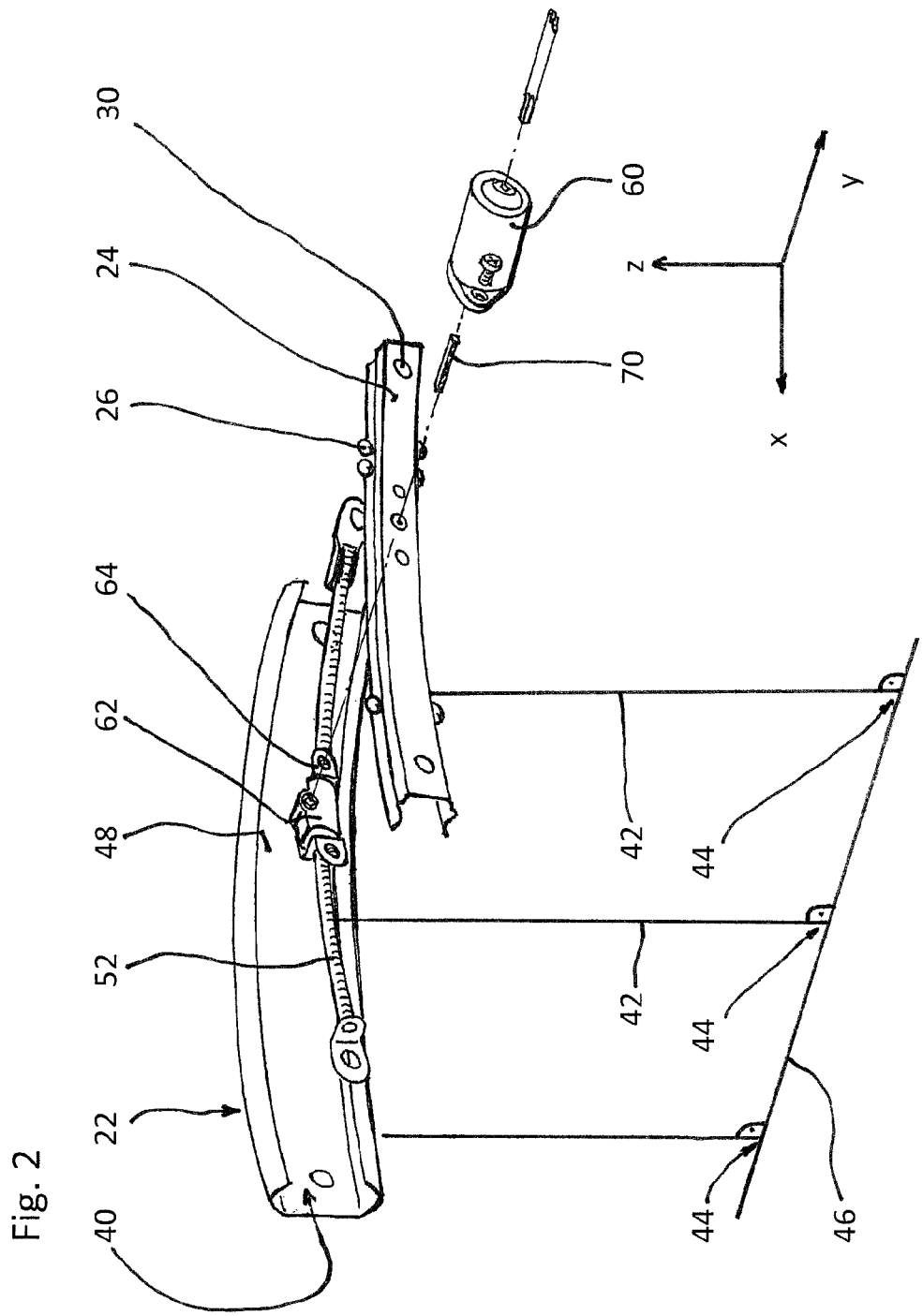
FIG. 2 is a perspective view in the form of an assembly view of a rail guide with an additional spindle drive.

Referring to the drawings in particular, the motor vehicle seat shown in FIG. 1 is shown in two different extreme positions, namely in continuous lines in a rearmost position and in dash-dotted lines in a foremost position. Both positions are reached along a displacement path 20 extending on an arc of a circle.

In the known manner, the motor vehicle seat has at least one pair of rails comprising a floor rail 22, a seat rail 24 and guiding means 26. In the exemplary embodiment shown, two rail guides disposed parallel to each other are provided. In the exemplary embodiment, they are constructionally identical. The guiding means 26 are configured as balls; other configurations are possible. The floor rail 22 is substantially C-shaped. It is formed as a grasping rail. It comprises means for fastening to a floor assembly 28 of a motor vehicle that is otherwise not shown in more detail. The seat rail 24 is a rail which is grasped; it is also substantially C-shaped. It comprises means 30 which are in this case configured as openings; they serve for connection to a front connecting part 32 and a rear connecting part 34 for each seat side. These connecting parts 32, 34 support a seat region 36. The latter is rigidly connected to the seat rail 24. A backrest 38 is provided. As the Figure shows, no means are provided for seat inclination adjustment, seat height adjustment and inclination adjustment of the backrest 38.

A right-handed x-y-z coordinate system is used for the description. The x-axis and the y-axis lie in the horizontal. The x-axis points in the direction of normal straight travel of the motor vehicle. The z-axis extends parallel to a vertical.

The two rails 22, 24 of each rail guide delimit a channel-shaped cavity 40. It is open only in the x-direction.

The floor rail 22 and the seat rail 24 are curved each with the same circular radius of curvature. The displacement path 20 has at least a length of 150 mm and at most a length of 350 mm. Preferably, the displacement path 20 is in the range of 250 mm to 300 mm. The radius of curvature R 42 is between 1,500 and 3,000 m, in particular between 1,800 and 2,500 mm. A center 44 of curvature lies on a center point line 46, which is a parallel to the y-axis. The radii 42 of curvature for the individual edges of a rail 22 or 24 have different lengths and also different centers of curvature. All centers of curvature lie on a center point line 46. The radii each extend perpendicular to the center point line 46; in FIG. 2, this is represented by a corresponding symbol. The centers 44 of curvature of two different longitudinal edges of a rail 22 or 24 have, in the rail itself, the same spacing in the y-direction as on the center point line 46.

Both rails 22, 24 each have a base flange 48. This base flange extends in a plane parallel to the x-z-plane. The base flange 48 has the shape of a circular disc sector.

The two pairs of rails of the motor vehicle seat are offset only in the y-direction; in the x-direction and z-direction, they have matching coordinates. The offset in the y-direction corresponds to at least half the width of the seat region and is at most 120% of the width in the y-direction of the seat region.

FIG. 1 shows the state of the motor vehicle seat installed in the motor vehicle (not shown). In this state of installation, the rear end of the rails 20, 22 is the lowermost point. The designation front corresponds to the positive direction of the x-direction, and top corresponds to the positive direction of the z-axis.

The rail guide is disposed in the motor vehicle so as to rise towards the front. A tangent drawn to the foremost region of the floor rail 22 substantially extends parallel to the x-y-plane. The tangent deviates from this plane by preferably only ±° 5, particularly only ±° 3.

In a foremost position, the seat region 36 is inclined rearwards by an angle relative to the horizontal x-y-plane that is approximately 3°. The angle range can be 0 to 6°. Within the displacement path 20, a change 50 of angle by about 10° is achieved. This change of angle can be between 4 and 12°.

In the exemplary embodiment, the length of the front connecting parts 32 is slightly less, for example, 5 to 30% less, than the length of the rear connecting parts 34. The front connecting parts 32 of each seat side and also the rear connecting parts 34 of each seat side are of equal length in the longitudinal direction, which substantially matches the z-direction.

The center point line 46 is the location of the centers 44 of curvature. The latter are located underneath the rail guide and thus on the other side of the rail guide from the seat region 36 and the backrest 38.

A motor-operated adjustment device is provided which enables an adjustment of the motor vehicle seat within the displacement path 20. In a manner known per se, it comprises a spindle 52 which is non-rotatably connected at its ends to the floor rail 22 via brackets. In contrast to the prior art, the spindle 52 is curved along a circular line. This circular line has a radius of curvature corresponding to the radius of curvature of the rails 22, 24. The center of curvature lies on the center point line 46. Spindles 52 with a diameter of 6 to 10 mm are being used, for example a spindle 52 with an M8 thread. In a manner known per se, the spindle 52 is grasped by a spindle nut 54. This spindle nut 54 is straight. It has a length of 10 to 20 mm. Preferably, it is selected to be short. A length of 10 to 15 mm is preferred. The spindle nut 54 is a nut in accordance with the prior art. Preferably, however, the spindle nut 54 has a starting region 56 on each axial side that is configured in a conical manner or a manner that expands outwards in another manner. Due to the starting regions 56, a jamming of the spindle nut 54 is counteracted.

In a manner known per se, an external worm wheel is formed on the spindle nut 54, which is in engagement with a worm 58. The latter is connected to an electric motor 60 via an elastic output shaft 70. The electric motor 60 is responsible for both seat sides; it is connected to the rail guide of the other seat side via another elastic shaft. This is the prior art.

In a preferred alternative, a manual drive is used instead of an electric motor 60; in this case, a crank can be used, for example. The latter can be disposed underneath the front edge of the seat and have an axis of rotation substantially extending in the x-direction. It is connected to the two seat sides via elastic shafts.

The spindle nut 54 and the worm 58 are accommodated in a housing 62. The housing 62 is grasped by a clamp 64 that is substantially U-shaped. It has fastening areas; they are connected to the seat rail 24; for this purpose, the seat rail 24 comprises fastening holes. A passage of the seat rail 24 for the elastic output shaft 70 is located in the middle between the two fastening holes.

The method for producing the seat rails 22, 24 will be described in the following.

Figure 4:
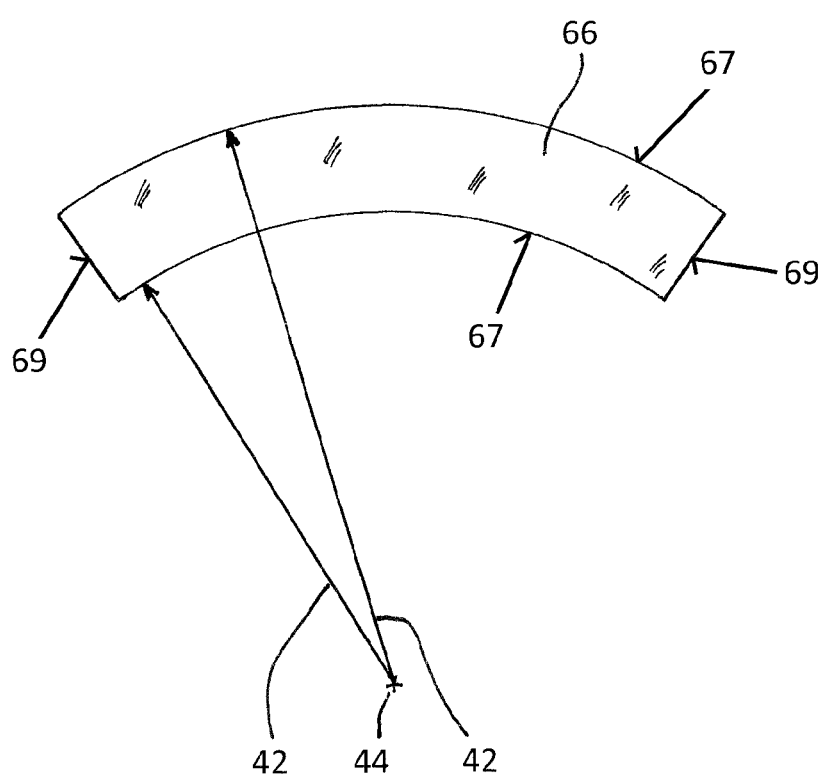
FIG. 4 is a top view of a blank for a rail.

FIG. 4 shows a banana-shaped or saber-shaped blank 66. It is cut from a metal sheet material. Steel sheet grades and thicknesses as in the prior art are used. In contrast to the prior art, the blank 66 is delimited by arcs of a circle having a radius of curvature corresponding to that of the finished rail. The blanks are laterally delimited by longitudinal edges 67 in the form of radial lines. As FIG. 4 shows, the centers of curvature 44 lie on a line extending in the paper plane which corresponds to the subsequent center point line 46. The centers of curvature 44 are distributed over a length corresponding to the thickness of the blank 66. The radius of the longitudinal edges 67 deviates from the radius of curvature by less than 3%. The blank has short transverse edges 69. They can extend at an angle relative to each other, as shown; they can also extend parallel to each other (not shown).

Figure 5:
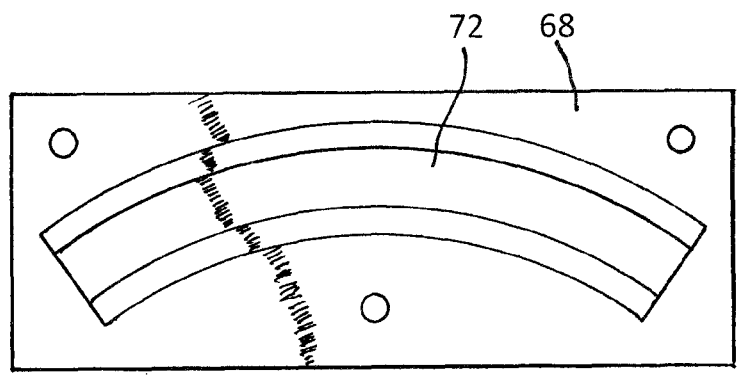
FIG. 5 is a schematic view of a stamping die with a top view of the die cavity.

FIG. 5 shows a part of a stamping die 68; only a schematic view is being shown. This stamping die 68 is associated with a corresponding counter die; the latter is not shown. Stamping the blank 66 can take place in a single stamping die 68; however, several stamping steps in different stamping dies 68 can also be carried out. The blank 66 is inserted into the stamping die 68, then the counter die is added and the stamping process is carried out. The stamping die has a cavity 72.

A production of the rail 22, 24 by gradually forming it along the curvature profile is not preferred; such a process would be, for example, a rolling process.

While specific embodiments of the invention have been shown and described in detail to illustrate the application of the principles of the invention, it will be understood that the invention may be embodied otherwise without departing from such principles.

The invention claimed is:

1. A motor vehicle seat comprising:
    a seat frame;
    a seat region;
    a backrest;
    an actuating drive of a longitudinal adjustment mechanism,
        the actuating drive comprising a rotary drive unit having an output shaft and a gear unit comprising a spindle nut rotationally connected to the output shaft, the spindle nut has an axial length of less than 20 mm, and a spindle comprising a spindle thread with which the spindle nut is in engagement, the spindle being curved in a circular radius of curvature between 1,500 and 3,000 mm and the spindle nut being a straight nut; and a rail guide comprising at least one pair of rails having a floor rail, a seat rail and balls disposed between the pair of rails, the rails of the pair of rails being displaceable relative to each other along a displacement path in a longitudinal direction, which is substantially parallel to an x-axis, the seat rail comprising fastening bolts for fastening the seat frame to be disposed above the pair of rails, the floor rail and the seat rail each being curved with the same circular radius of curvature as the spindle, a center of curvature being located on a side of the pair of rails facing away from the seat frame, and the spindle being non-rotatably connected to the floor rail, wherein the seat frame is connected to the fastening bolts, wherein the floor rail and the seat rail delimit a channel-shaped cavity accessible only in an x-direction, corresponding to a vehicle travel direction, and the spindle is located in the cavity, and a center of curvature of the radius of curvature is located on a plane that is parallel to an x-z-plane.

2. A motor vehicle seat according to claim 1, the floor rail is connected to a floor assembly of a motor vehicle, and, in relation to a vehicle located in a horizontal plane, the backrest, in the rearmost position of the longitudinal adjustment mechanism, is inclined rearwards at an angle of 10° to 20° measured from the vertical, and, in the foremost position of the longitudinal adjustment mechanism, is inclined rearwards at an angle of 5° to 15° measured from the vertical, with the change of angle between these two positions being at least 3°.

3. The vehicle seat according to claim 2, wherein the change of angle between the two positions is about 6°.

4. The vehicle seat according to claim 1, wherein the radius of curvature is between 1,800 and 2,500 mm.

5. The vehicle seat according to claim 2, wherein the rotary drive unit further comprises an electric motor.

6. The actuating drive according to claim 1, wherein the radius of curvature is between 1,800 and 2,500 mm.

7. The vehicle seat according to claim 1, wherein the rotary drive unit further comprises an electric motor.

8. A motor vehicle comprising:
   a floor assembly; and
   a seat comprising:
      a seat frame;
      a seat region;
      a backrest;
      an actuating drive of a longitudinal adjustment mechanism, the actuating drive comprising a rotary drive unit having an output shaft and a gear unit comprising a spindle nut rotationally connected to the output shaft and a spindle comprising a spindle thread with which the spindle nut is in engagement, the spindle being curved in a circular radius of curvature between 1,500 and 3,000 mm and the spindle nut being a straight nut; and
      a rail guide comprising at least one pair of rails having a floor rail, a seat rail and balls disposed between the pair of rails, the rails of the pair of rails being displaceable relative to each other along a displacement path in a longitudinal direction, which is substantially parallel to an x-axis, the seat rail comprising fastening bolts for fastening the seat frame to be disposed above the pair of rails, the floor rail and the seat rail each being curved with the same circular radius of curvature as the spindle, a center of curvature being located on a side of the pair of rails facing away from the seat frame, and the spindle being non-rotatably connected to the floor rail, wherein the seat frame is connected to the fastening bolts, wherein:
      the floor rail is connected to the floor assembly;
      in relation to the vehicle being located relative to a horizontal plane, the backrest, in the rearmost position of the longitudinal adjustment mechanism, is inclined rearwards at an angle of 10° to 20° measured from vertical, and, in the foremost position of the longitudinal adjustment mechanism, is inclined rearwards at an angle of 5° to 15° measured from vertical, with the change of angle between these two positions being at least 3°, wherein the spindle nut has an axial length of less than 20 mm.

9. The motor vehicle according to claim 8, wherein the change of angle between the two positions is about 6°.

10. The motor vehicle according to claim 8, wherein the radius of curvature is between 1,800 and 2,500 mm.

11. A motor vehicle seat assembly comprising:
   a seat region having a front side and a back side, and having two lateral sides arranged on diametrically opposite sides of said seat region and extending from said front side to said back side, a direction from said back side to said front side being an X direction, a direction from one said lateral side to an opposite lateral side being an Y direction, a direction perpendicular to said X and Y directions being a Z direction;
   a backrest non-pivotally fixed to said seat region, said backrest having a top side and a bottom side, said bottom side being mounted on said back side of said seat region, said backrest extending predominately in said Z direction;
   a seat rail mounted on said seat region adjacent said one lateral side with a longitudinal axis predominately in said X direction, said seat rail having a cross section in a Y-Z plane that is substantially C shaped, said C shape having an opening directed outward of a center of said seat region;
   a floor rail movably mounted on said seat rail with a longitudinal axis predominately in said X direction, said floor rail having a cross section in said Y-Z plane that is substantially C shaped, said C shape having an opening directed toward said center of said seat region, said floor rail and said seat rail being arranged to have edges of said C shape of one said rail be arranged radially inwards of edges of said C shape of the other said rail, said C shape of said floor and said seat rail defining a channel extending predominantly in said X direction;
   a plurality of balls arranged between said edges of said C shape of said seat rail and said floor rail, said plurality of balls being arranged to have said seat rail be slidably mounted with respect to said floor rail;
   a threaded spindle being arranged in said channel and fixed to said floor rail, said spindle, said seat rail and said floor rail being curved in a circular radius of curvature between 1,500 mm and 3,000 mm;
   a spindle nut engaged with said spindle;
   a rotary drive unit mounted on said seat region and arranged to selectively rotate said spindle nut to move said seat region with respect to said floor rail.

12. A motor vehicle seat assembly in accordance with claim 11, wherein:
   said seat rail defines a passage in a middle part of said C shape;
   said rotary drive unit includes an output shaft that extends though said passage to said spindle nut;
   said spindle nut is fixed to said seat rail in said X direction.

13. A motor vehicle seat assembly in accordance with claim 11, further comprising:

another seat rail mounted adjacent said opposite lateral side with a longitudinal axis predominately in said X direction, said another seat rail having a cross section in said Y-Z plane that is substantially C shaped, said C shape having an opening directed outward of said center of said seat region;

another floor rail mounted adjacent said opposite lateral side with a longitudinal axis predominately in said X direction, said another floor rail having a cross section in an Y-Z plane that is substantially C shaped, said C shape having an opening directed toward said center of said seat region, said another floor rail and said another seat rail being arranged to have edges of said C shape of one said another rails be arranged radially inwards of edges of said C shape of the other another rail, said C shape of said another floor rail and said another seat rail defining a channel extending predominantly in the X direction, said another seat rail and said another floor rail being curved in a circular radius of curvature between 1,500 mm and 3,000 mm;

another plurality of balls arranged between said edges of said C shape of said another seat rail and said another floor rail, said another plurality of balls being arranged to have said another seat rail be slidably mounted with respect to said another floor rail.

14. A motor vehicle seat assembly according to claim 11, wherein:

said backrest, said rails and said curvatures are arranged to have said backrest be inclined rearwards at an angle of 10° to 20° measured from vertical in a rearmost position of said seat rail with respect to said floor rail;

said backrest, said rails and said curvatures also are arranged to have said backrest be inclined rearwards at an angle of 5° to 15° measured from vertical in a foremost position of said seat rail with respect to said floor rail, with the change of angle between the rearmost and foremost positions being at least 3°.

15. A motor vehicle seat assembly according to claim 11, wherein:

a center of curvature of said radius of curvature is located on a plane that is parallel to an X-Z plane and extends through a longitudinal center of said spindle.

* * * * *